(12) United States Patent  
Lin

(10) Patent No.: US 8,249,384 B2  
(45) Date of Patent: Aug. 21, 2012

(54) METHOD AND SYSTEM FOR REMOVING DATE AND TIME STAMP OF DIGITAL IMAGE IN IMAGING DEVICE

(75) Inventor: Chang-Chiang Lin, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 957 days.

(21) Appl. No.: 12/266,561

(22) Filed: Nov. 7, 2008

(65) Prior Publication Data

US 2010/0014783 A1    Jan. 21, 2010

(30) Foreign Application Priority Data

Jul. 17, 2008    (CN) .......................... 2008 1 0302774

(51) Int. Cl.
  *G06K 9/36* (2006.01)
  *G06K 9/00* (2006.01)
(52) U.S. Cl. ..................... 382/276; 382/100; 382/181
(58) Field of Classification Search .................. None
  See application file for complete search history.

(56) References Cited

U.S. PATENT DOCUMENTS

| 3,346,853 | A | * | 10/1967 | Koster et al. | 345/440 |
|---|---|---|---|---|---|
| 4,992,828 | A | * | 2/1991 | Liston | 399/184 |
| 5,267,333 | A | * | 11/1993 | Aono et al. | 382/166 |
| 5,477,264 | A | * | 12/1995 | Sarbadhikari et al. | 348/231.6 |
| 6,389,155 | B2 | * | 5/2002 | Funayama et al. | 382/118 |
| 6,826,305 | B2 | * | 11/2004 | Zhu | 382/172 |
| 7,095,948 | B2 | * | 8/2006 | Teunissen | 386/329 |
| 7,508,940 | B2 | * | 3/2009 | Kato et al. | 380/200 |
| 7,548,659 | B2 | * | 6/2009 | Ofek et al. | 382/254 |
| 7,561,742 | B2 | * | 7/2009 | Boose et al. | 382/190 |
| 7,570,807 | B2 | * | 8/2009 | Hanazato | 382/162 |
| 7,657,091 | B2 | * | 2/2010 | Postnikov et al. | 382/178 |
| 7,702,135 | B2 | * | 4/2010 | Hill et al. | 382/107 |
| 7,848,519 | B2 | * | 12/2010 | Kato et al. | 380/200 |
| 8,023,694 | B2 | * | 9/2011 | Rhoads et al. | 382/100 |
| 2003/0072564 | A1 | * | 4/2003 | Teunissen | 386/111 |
| 2006/0257042 | A1 | * | 11/2006 | Ofek et al. | 382/255 |
| 2007/0154013 | A1 | * | 7/2007 | Kato et al. | 380/200 |
| 2009/0196512 | A1 | * | 8/2009 | Shelton et al. | 382/229 |

FOREIGN PATENT DOCUMENTS

CN    1095174 A    11/1994
TW    200525273 A    8/2005

* cited by examiner

*Primary Examiner* — Manav Seth
(74) *Attorney, Agent, or Firm* — Altis Law Group, Inc.

(57) ABSTRACT

A method for removing date/time of a digital image file having a predefined date/time stamp location in an imaging device, wherein the image data of the digital image, and a position coordinates of the predefined date/time stamp location, are stored in the digital image file. The method includes: selecting the digital image having the predefined date/time stamp location; obtaining and saving the image data and the position coordinates of the predefined date/time stamp location from the digital image file; and applying the original date/time stamp according to the position coordinates of the predefined date/time stamp location.

7 Claims, 2 Drawing Sheets

METHOD AND SYSTEM FOR REMOVING DATE AND TIME STAMP OF DIGITAL IMAGE IN IMAGING DEVICE

BACKGROUND

1. Field of the Invention

Embodiments of the present disclosure relate to imaging devices and, particularly, to a method and system for removing date/time of a digital image in an imaging device.

2. Description of Related Art

Generally, imaging devices such as digital video and still cameras, include a real-time clock, which provides a current date/time. Images captured by an imaging device may comprise a current date/time stored as metadata within a digital image file of the captured image. If a date and time is needed to be recorded with the captured images, users operate a function for applying a date/time stamp to captured images before capturing an image.

However, the image data of the digital image will be altered because of the appended date/time stamp. Users can not obtain the integrated image information from the captured image. If a date and time do not need to be recorded with the captured images, and the user has inadvertently added the date/time stamp, the user will end up with having an imperfect image embedded with recorded date and time.

Therefore, it is desirable to provide a method and a system for removing a date and time metadata in an imaging device, which can overcome the above mentioned problems.

DETAILED DESCRIPTION

Figure 1:
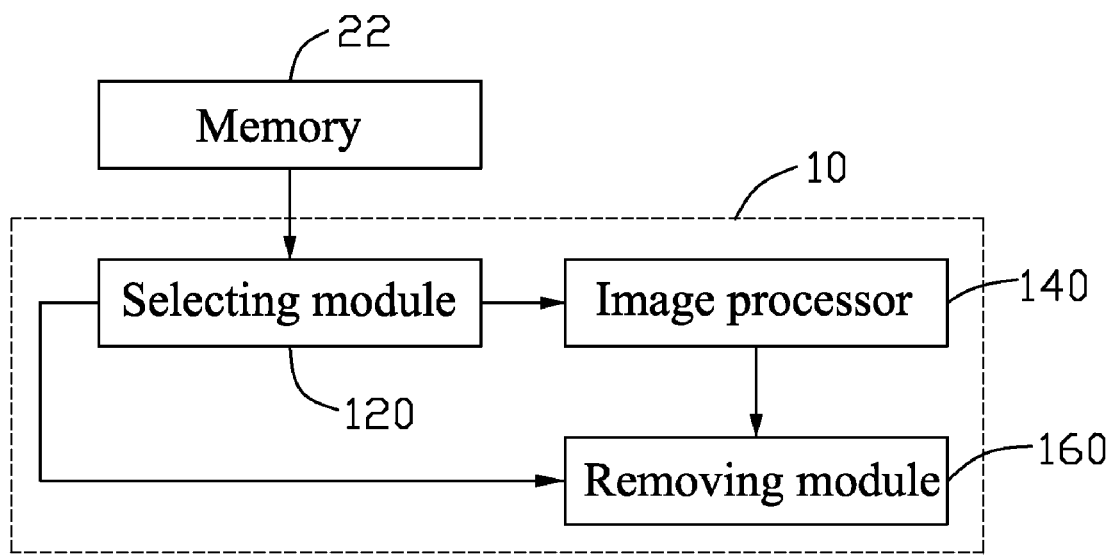
FIG. 1 is a block diagram of one embodiment of a system for removing date/time of a digital image in an imaging device.

FIG. 1 is a block diagram of one embodiment of a system 10 configured to remove date/time of a digital image having a predefined date/time stamp location in an imaging device. The imaging device includes a memory 22 for pre-storing a position coordinates of the predefined date/time stamp location. In one embodiment, the imaging device is a digital camera. When a digital image is captured by the imaging device, the predefined date/time stamp location is determined according to the position coordinates of the predefined date/time stamp location. Specifically, the position coordinates of the predefined date/time stamp location can be reset according to an operational input when a stamping date/time model is employed in the imaging device.

In one embodiment, each digital image captured by the imaging device may be recorded as a digital image file in the Exchangeable image file format (Exif), Tag Image File Format (TTFF) or Joint Photographic Experts Group (JPEG) 2000 file format. The image data of the predefined date/time stamp location and the position coordinates of the predefined date/time stamp location are written in a header of the digital image file. It is to be understood, the image data of the predefined date stamp location are created before a date is applied to the image digital.

The system 10 includes a selecting module 120, an image processor 140, and a removing module 160. The selecting module 120 is configured for selecting a digital image having the predefined date/time stamp location from the imaging device, such as a digital video or still camera. The image processor 140 is configured for obtaining and saving image data and the position coordinates of the predefined date/time stamp location from the header of the digital image file. The removing module 160 is configured for applying the image data of the predefined date/time stamp location according to the position coordinates of the predefined date/time stamp location saved in the image processor 140.

Advantageously, the image processor 140 may comprise a digital signal processor (DSP) for processing various functions of the imaging device. When the system 10 is used in the digital camera, the image processor 140 is the digital signal processor of the digital camera. The memory 22 can digitally store a number of digital images onto the memory 22. The selecting module 120 selects digital images from the memory 22 of the imaging device.

Figure 2:
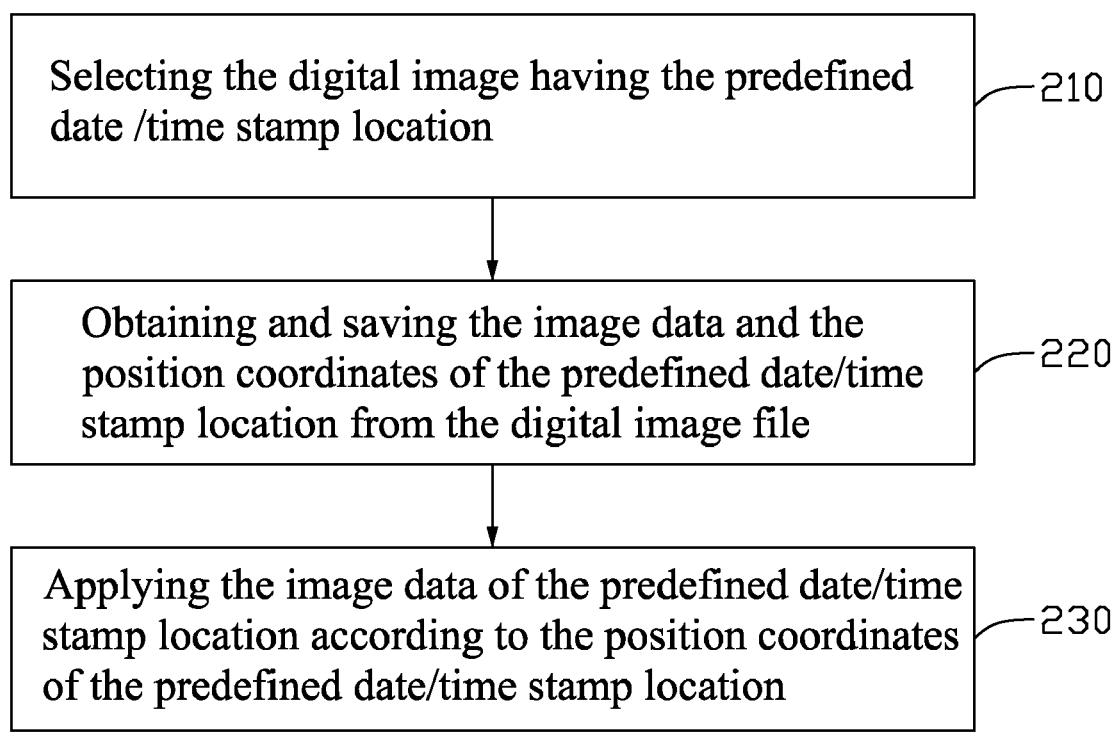
FIG. 2 is a flowchart of one embodiment of a method for removing date/time of a digital image in an imaging device.

FIG. 2 is a flowchart of one embodiment of a method for removing a date/time of a digital image in an imaging device.

In step 210, the selecting module 120 selects the digital image from the memory 22 of the imaging device. As mentioned above, the digital image has the predefined date/time stamp location.

In step 220, the image processor 140 obtains and saves the image data, from the digital image, and the position coordinates of the predefined date/time stamp location from a header of the digital image file. As mentioned above, the image data of the predefined date/time stamp location are created before the date/time is applied to the image digital.

In step 230, the removing module 160 apply the image data of the predefined date/time stamp location according to the position coordinates of the predefined date/time stamp location. For example, the removing module 160 may change pixel values of an original date/time stamp to be the same as pixel values of the image data of the predefined date/time stamp location according to the position coordinates of the predefined date/time stamp location.

If the date/time stamp of the digital image is not need, the method and system for removing the date/time can remove the date/time to obtain the initial digital image without the date/time stamp, thereby, the whole image information can be obtained. The method and system for removing the date/time is convenient for users.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A method for removing date/time stamp of a digital image having a predefined date/time stamp location in an imaging device, wherein an image data and the position coordinates of the predefined date/time stamp location are stored in a digital image file of the digital image, the method comprising:

selecting the digital image having the predefined date/time stamp location;

obtaining and saving the image data and the position coordinates of the predefined date/time stamp location from the digital image; and applying the image data of the predefined date/time stamp location according to the position coordinates of the predefined date/time stamp location.

2. The method of claim 1, wherein the digital image file is stored in a format selected from the group consisting of Exchangeable image file format, Tag Image File Format, and Joint Photographic Experts Group 2000 file format.

3. The method of claim 1, wherein the image device is a digital camera.

4. A system for removing date/time of a digital image having a predefined date/time stamp location in an imaging device, wherein an image data and a position coordinates of the predefined date/time stamp location are stored in a digital image file of the digital image, the system comprising:

a selecting module configured for selecting the digital image file having the predefined date/time stamp location;

an image processor module configured for obtaining and saving the image data and the position coordinates of the predefined date/time stamp location from the digital image file; and a removing module configured for applying the image data of the predefined date/time stamp location according to the position coordinates of the predefined date/time stamp location.

5. The system of claim 4, wherein the digital image file is stored in a format selected from the group consisting of Exchangeable image file format, Tag Image File Format, and Joint Photographic Experts Group 2000 file format.

6. The method of claim 4, wherein the imaging device is a digital camera.

7. The method of claim 6, wherein the image processor is a digital signal processor of the digital camera.

* * * * *